United States Patent [19]

Hattori

[11] 4,290,103

[45] Sep. 15, 1981

[54] SYSTEM AND METHOD FOR ACHIEVING BUFFER MEMORY COINCIDENCE IN A MULTIPROCESSOR SYSTEM

[75] Inventor: Akira Hattori, Yokohama, Japan

[73] Assignee: Fujitsu Limited, Japan

[21] Appl. No.: 955,760

[22] Filed: Oct. 30, 1978

[30] Foreign Application Priority Data

Dec. 29, 1977 [JP] Japan ............................... 52-160451

[51] Int. Cl.³ .............................................. G06F 13/00
[52] U.S. Cl. .................................................... 364/200
[58] Field of Search ............... 364/200, 900; 235/307, 235/304; 340/146.1 BE

[56] References Cited

U.S. PATENT DOCUMENTS

| | | | |
|---|---|---|---|
| 4,056,844 | 11/1977 | Izumi ................................. | 364/200 |
| 4,136,386 | 1/1979 | Annunziata et al. ............. | 364/200 |
| 4,142,234 | 2/1979 | Bean .................................. | 364/200 |

OTHER PUBLICATIONS

R. Meade, "On Memory System Design", F.J.C.C., 1970, pp. 33-38.

Primary Examiner—Charles E. Atkinson
Assistant Examiner—E. S. Kemeny
Attorney, Agent, or Firm—Staas & Halsey

[57] ABSTRACT

Effective expansion of a common intermediate buffer memory by equivalent use of the buffer memory in each CPU in a multiprocessor system. A method and system for achieving buffer memory coincidence is applied to a multiprocessor system provided with central processing units, buffer memories contained in respective central processing units, a main memory, and an intermediate buffer memory connected between the main memory and the buffer memories, wherein a buffer invalidation address information (BIA GO) is sent from the intermediate buffer memory to the i-th central processing unit (BIA GO #i) in accordance with the following logical expression:

$$\text{BIA GO} \#i = \overline{\text{REQ.CPU}} \times W \times \{\overline{F} \vee F \times (\text{COPY}\#i \vee \overline{\text{VIF}})\}$$

where the term "$\overline{\text{REQ.CPU}}$" indicates that the i-th central processing unit does not provide a request for accessing the intermediate buffer memory, the term "W" indicates that the above request is a request for writing a data block, term "F" and "$\overline{F}$" indicate that the accessed data block is found and is not found, respectively, in the intermediate buffer memory, the term "COPY #i" indicates that a copy of the corresponding data block is stored in the buffer memory of the i-th central processing unit, the validity flag term $\overline{\text{VIF}}$ indicates the possibility that the copy flags are incorrect, and the symbols "x" and "$v$" represent a logical product and a logical sum, respectively. This method makes it possible to store data blocks which exist only in the buffer memory but do not exist in the intermediate buffer memory.

26 Claims, 17 Drawing Figures

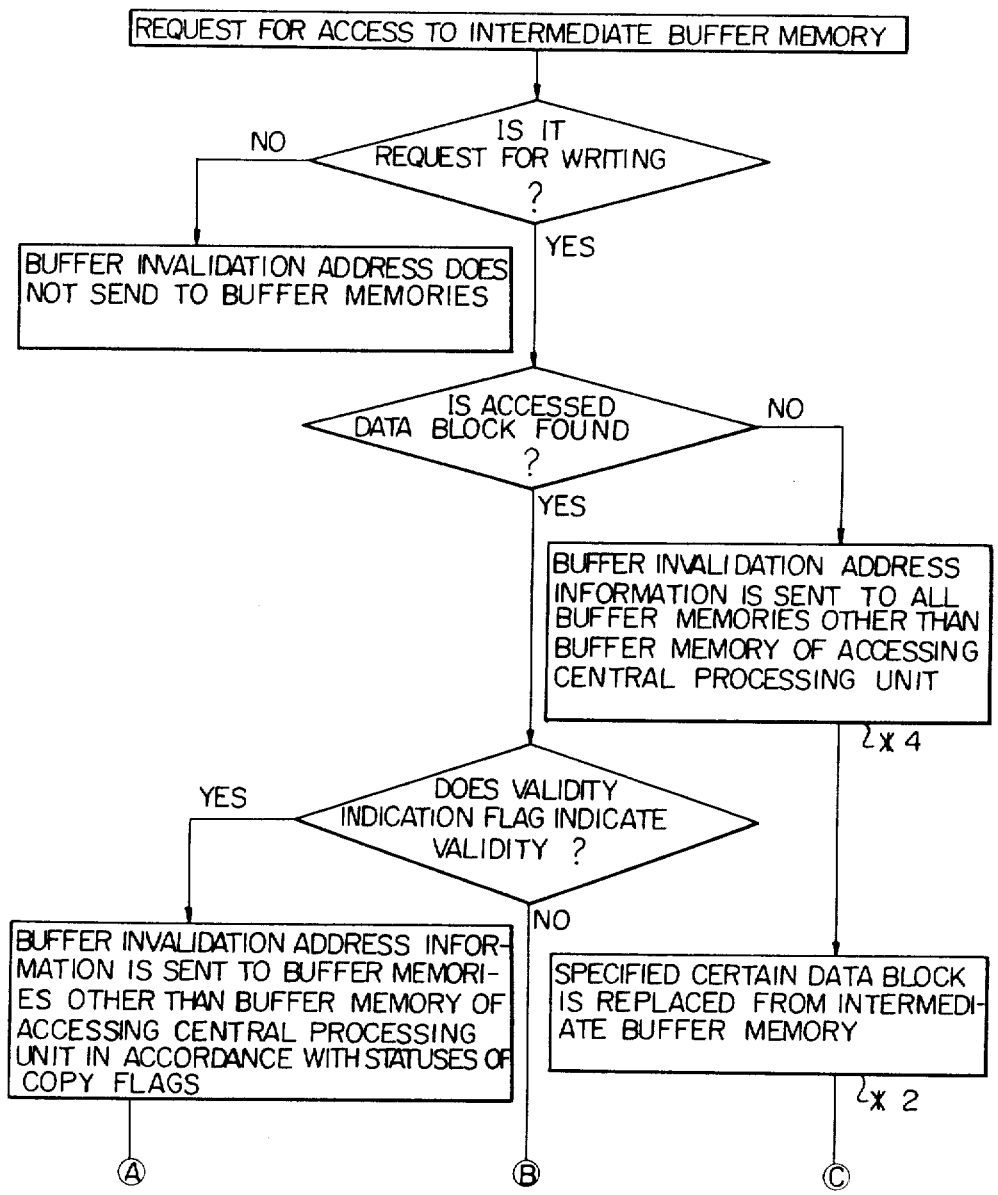

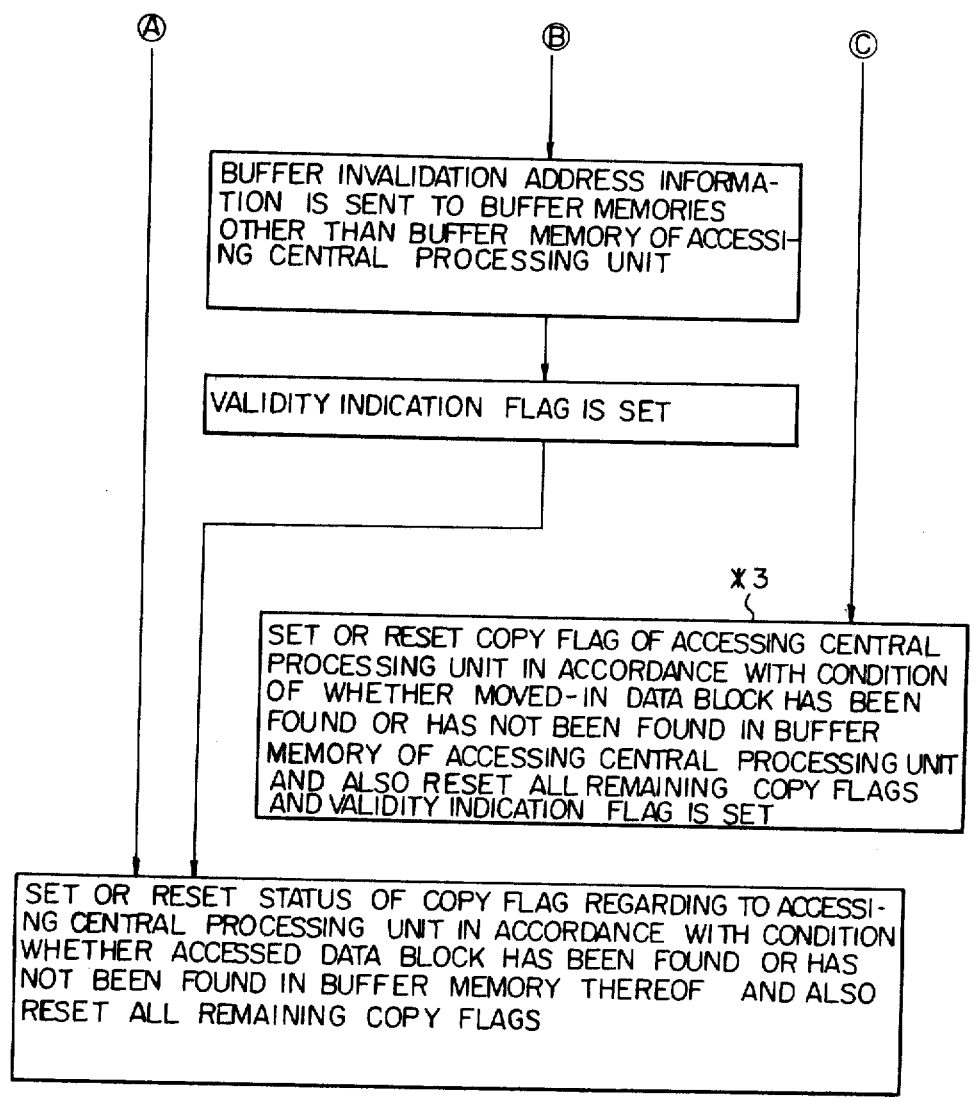

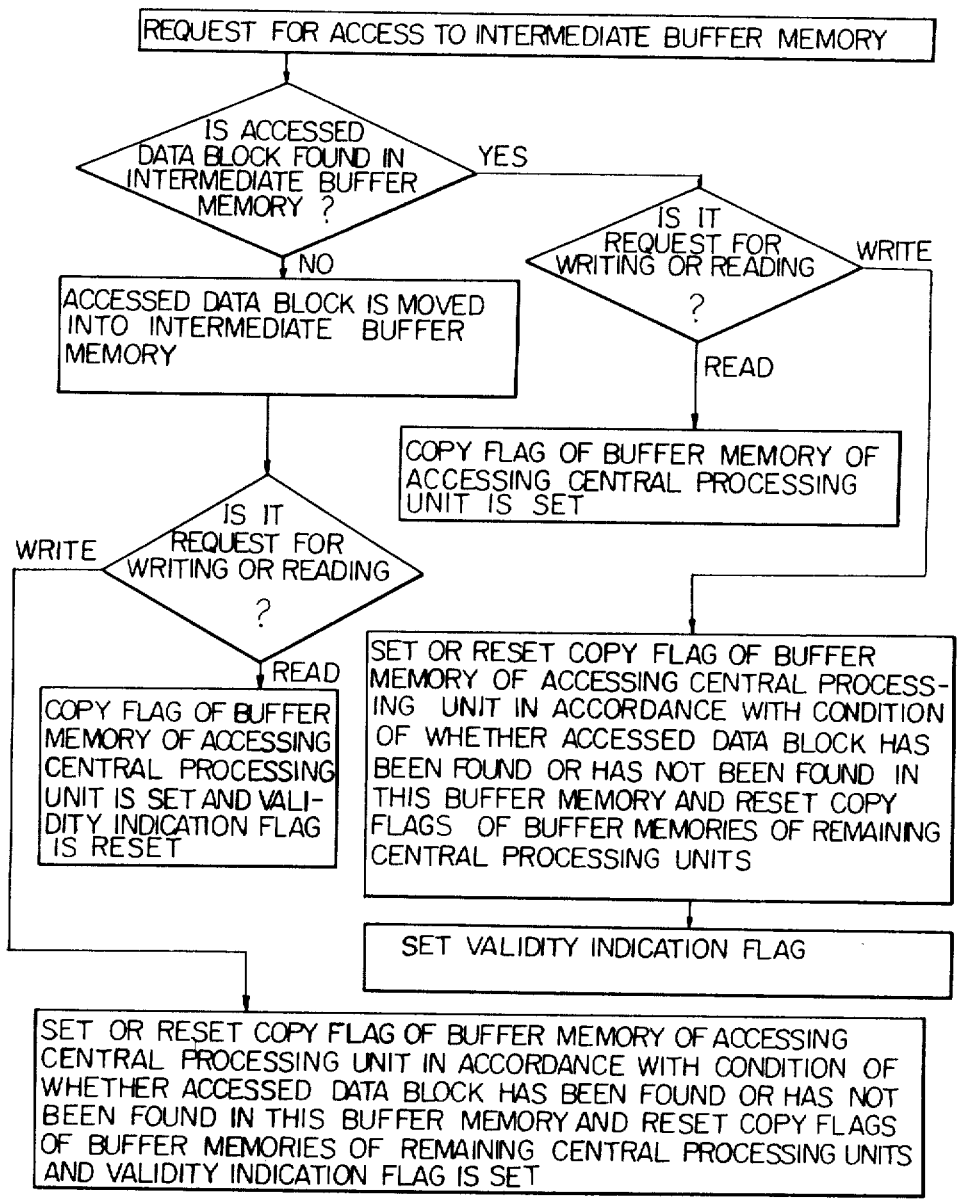

SYSTEM AND METHOD FOR ACHIEVING BUFFER MEMORY COINCIDENCE IN A MULTIPROCESSOR SYSTEM

BACKGROUND OF THE INVENTION

1. Field of the Invention

The present invention relates to a system and method for supervising a buffer memory hierarchy provided in a computer system comprised of a plurality of central processing units (each of which has a respective buffer memory therein), a plurality of channel processors, a main memory, an intermediate buffer memory commonly occupied by the buffer memories, channel processors and main memory.

A computer system which is comprised of a plurality of central processing units is usually called a multiprocessor system. In a multiprocessor system, it is important that a data block stored at an address in buffer memory in one processor always coincides with a data block to be stored at a corresponding address in buffer memory in the other processor. The latter condition is known as buffer memory coincidence.

In the prior art, there are two methods for achieving the above-mentioned buffer memory coincidence. A first method for achieving buffer memory coincidence is by the application of a buffer invalidation address simultaneously to all of the processors except for one processor when a data block stored at an address in buffer memory in the processor is changed. The above application of the buffer invalidation address to the buffer memories of all the processors except for one processor is performed regardless of whether the corresponding address of the buffer memory in each of the former processors is or is not found therein. This corresponding address is the same as the buffer invalidation address.

A second method for achieving the above-mentioned buffer memory coincidence is to provide, in each processor, a tag II as opposed to a conventional tag I. In this second method, the buffer invalidation address mentioned in the first method is applied only to the buffer memories which include corresponding addresses, in respective processors, by means of the tag II.

In the above-described conventional multiprocessor system, a memory system is comprised of a main memory and buffer memories contained in respective central processing units. In recent years, however, a new memory system for the conventional multiprocessor system has been proposed. In such a new memory system, as proposed in, for example, "Determining Hit Ratios for Multilevel Hierarchies", by J. Gesei, I.B.M. J. Res. Develop., July, 1974, or "On Memory System Design", by Robert M. Meade, FJCC, 1970, pages 33 through 34, an intermediate buffer memory is further inserted between the main memory and the buffer memories. When each central processing unit of the multiprocessor system becomes large in scale and high in operation speed, it is relatively easy to produce high speed operating buffer memories. However, with regard to the main memory, it is very difficult to produce a main memory which is large in scale and which, at the same time, has a high operating speed. Therefore, when each central processing unit of the multiprocessor system becomes large in size and high in operating speed, it is impossible to directly connect the main memory to the buffer memories without introducing an intermediate means therebetween. Thus, the above-mentioned intermediate buffer memory is employed as this intermediate means. The memory capacity of the intermediate buffer memory is larger than that of each buffer memory but smaller than that of the main memory. Also, the access time of the intermediate buffer memory is longer than that of each buffer memory but shorter than that of the main memory.

Thus, a better method and system for achieving buffer memory coincidence should be proposed. Such proposed method should be suitable for a memory system which includes the intermediate buffer memory. One method for achieving buffer memory coincidence is already known. In the multiprocessor system to which the known method is applied, there are a plurality of central processing units, a plurality of channel processors, an intermediate buffer memory, a main memory and a plurality of buffer memories contained in the respective central processing units. When the intermediate buffer memory receives, from one of the central processing units, a request for access of a data block of the buffer memory, the intermediate buffer memory starts detecting whether or not a corresponding data block is stored therein by means of a tag contained therein. If the corresponding data block is not stored therein, the intermediate buffer memory will determine which data block is to be replaced, and then the corresponding data block is moved into the address of this memory from the main memory, which address is the position where the replaced data block was stored in the intermediate buffer memory. The tag of the intermediate buffer memory is provided with a plurality of supervising information memory areas and data block memory areas. Each supervising information memory area contains both an address information of the data block stored in the corresponding data block memory area and copy flags for indicating which one of the buffer memories has a copy of the corresponding data block. When the intermediate buffer memory determines which of the above-mentioned data blocks is to be replaced, then the intermediate buffer memory checks the copy flags. As a result, the intermediate buffer memory sends the buffer invalidation address information only to buffer memories which store copies of the replaced data block. The buffer invalidation address is the same as the address of each of the buffer memories which has a copy of the replaced data block stored therein.

Contrary to the above, if the corresponding data block is stored in the intermediate buffer memory, when the intermediate buffer memory receives a request from one of the central processing units for access of the corresponding data block, and, further, when the request is a request for writing a data block, an address of this data block to be written is sent as the buffer invalidation address information only to every buffer memory containing a corresponding address from the intermediate buffer memory in accordance with the status of the copy flags. Alternatively, when such request is not a request for writing a data block but a request for reading a data block, it is not necessary to send the buffer invalidation address information from the intermediate buffer memory to the buffer memories.

An undesirable problem, as described hereinafter, exists in any multiprocessor system to which the above-mentioned known method is applied. When one central processing unit sends a request to the intermediate buffer memory for writing or reading a data block, and the corresponding data block is, however, not stored therein, the intermediate buffer memory then must determine which data block is to be replaced therefrom in order to move the corresponding data block from the main memory to the intermediate buffer memory. In this case, the address of the replaced data block is sent as buffer invalidation address information to each buffer memory containing a copy of the replaced data block in accordance with the status of the copy flags. Thereafter, copies of the replaced data block are erased from the respective buffer memories. However, if a particular central processing unit uses a copy of the replaced data block contained in the buffer memory of this central processing unit very frequently, it is not preferable for this central processing unit to erase the copy of the replaced data block from the buffer memory. Nevertheless, according to the known method, such copy is unfortunately erased therefrom and the above-mentioned undesirable problem therefore occurs because the intermediate buffer memory and the buffer memories are supervised in accordance with the method whereby the data blocks stored in at least one of the buffer memories must also be stored in the intermediate buffer memory.

SUMMARY OF THE INVENTION

Therefore, it is an object of the present invention to provide a method and system for achieving a buffer memory coincidence without causing the above-mentioned undesirable problem.

The system and method of the present invention is such that when a data block, which is stored in both a first CPU buffer memory and in the intermediate buffer memory, is replaced from the intermediate buffer memory because of a request for reading access by a second CPU, the copy of this replaced data block is not erased from the buffer memory of the first CPU. Thus, it is possible that buffer memories of the CUPs hold data blocks which are not stored in the intermediate buffer memory. A validity flag is provided in order to indicate the possibility that the copy flags relating to a particular CPU may contain false information.

Thus, using the method and system of the present invention it is possible to store data blocks which exist only in the buffer memories of the CUPs but do not exist in the intermediate buffer memory. As a result the total and effective memory space of the present invention is greater than that of the prior art.

The present invention will be more apparent from the ensuing description with reference to the accompanying drawings wherein:

FIG. 1 illustrates a conventional multiprocessor system to which a method of the present invention is applied;

FIG. 2 is a flow diagram indicating the steps of a known method for carrying out a buffer memory coincidence;

FIGS. 3A, 3B and 3C are respective explanatory illustrations of the steps indicated in FIG. 2;

FIG. 4 illustrates a tag used in the present invention;

FIGS. 5A(1), 5A(2) and 5B are flow diagrams indicating the steps of a method for achieving buffer memory coincidence according to the present invention;

FIGS. 6A, 6B, 6C and 6D are respective explanatory illustrations of the steps indicated in FIGS. 5A(1) 5A(2), and 5B, according to the present invention;

FIG. 7A illustrates an explanatory memory capacity pattern created by using a method of the present invention;

FIG. 7B illustrates an explanatory memory capacity pattern created by using the known method;

FIG. 8 is a block diagram showing a detailed example of an intermediate buffer memory 63 shown in FIGS. 6A through 6D, according to the system of the present invention; and FIG. 9 shows one example of gate circuits utilized for constructing a logic circuit 100 shown in FIG. 8.

DESCRIPTION OF THE PREFERRED EMBODIMENT

In FIG. 1 which illustrates a conventional multiprocessor system, the reference numerals 11-0, 11-1 through 11-m represent central processing units ($CPU_0$, $CPU_1$ ... $CPU_m$), respectively. The reference numerals 12-0, 12-1 through 12-n represent channel processors ($CHP_0$, $CHP_1$ ... $CHP_n$), respectively. The reference numeral 13 represents an intermediate buffer memory (IBM). The reference numeral 14 represents a main memory (MM). The central processing units 11-0, 11-1 through 11-m contain buffer memories (BM) 15-0, 15-1 through 15-m, respectively. With reference to FIG. 1, a known method for achieving thhe buffer memory coincidence is as follows. Referring to FIGS. 1, 2 and 3A through 3C, when the intermediate buffer memory 13 receives a request for access of a data block of buffer memory 13 (see "REQUEST FOR ACCESS TO INTERMEDIATE BUFFER MEMORY" in FIG. 2) from, for example, the central processing unit 11-1, the intermediate buffer memory 13 starts to detect whether or not a corresponding data block is stored therein by means of a tag 31 (see FIGS. 3A through 3C) contained therein (see "IS ACCESSED DATA BLOCK FOUND?" in FIG. 2). If the accessed data block is not found (see "NO" in FIG. 2), the intermediate buffer memory 13 then determines which data block is to be replaced therefrom (see "DETERMINING DATA BLOCK TO BE REPLACED" in FIG. 2). The tag 31 is provided with a plurality of supervising information memory areas (not shown in FIG. 1 and FIGS. 3A through 3C) and a data block memory 32 (FIGS. 3A through 3C). Each supervising information memory area contains both an address information of a corresponding data block memory area and copy flags 33 (FIGS. 3A through 3C) for indicating which of the buffer memories 15-0, 15-1 through 15-m has a copy of the corresponding data block stored therein. When the intermediate buffer memory 13 has determined which of the data blocks is to be replaced therefrom, then this memory 13 checks the copy flags 33. Each of the copy flags corresponds to a respective one of the buffer memories 15-0, 15-1 through 15-m. A copy flag having a logic "1" for the replaced data block memory area indicates that a copy of the replaced data block is stored in the respective buffer memory. When the intermediate buffer memory 13 determines a data block to be replaced therefrom, the memory 13 sends the buffer invalidation address (BIA) information to the buffer memories in accordance with the status of the copy flags 33 (see "BUFFER INVALIDATION ADDRESS INFORMATION IS SENT TO BUFFER MEMORIES IN ACCORDANCE WITH STATUS OF COPY FLAGS OF REPLACED DATA BLOCK in FIG. 2"). Thus, when the data block is replaced from the intermediate buffer memory 13, copies of this replaced data block are also erased from each of the buffer memories having a block indicating that the copy flag is a logic "1" (see FIG. 3C).

If the accessed data block is found in the intermediate buffer memory 13 (see "YES" of "IS ACCESSED DATA BLOCK FOUND?" in FIG. 2), the memory 13 further detects whether the request for access sent from the central processing unit 11-1 is a request for writing a data block or a request for reading a data block (see "IS IT REQUEST FOR WRITING?" in FIG. 2). If the request for access is a request for writing a data block (see "YES" in FIG. 2), an address of the accessed data block to be written is sent to buffer memories as buffer invalidation address (BIA) information, and the copy flag in the memory 13 of each of these buffer memories has the status of logic "1" (see "BUFFER INVALIDATION ADDRESS INFORMATION IS SENT TO BUFFER MEMORIES IN ACCORDANCE WITH STATUS OF COPY FLAGS OF DATA BLOCK TO BE WRITTEN" in FIG. 2, and also refer to FIG. 3B).

Contrary to this, if the request for access is not a request for writing a data block but a request for reading a data block (see "NO" in FIG. 2), buffer invalidation address information is not sent to any of the buffer memories 15-1 through 15-m, because it is not necessary to erase copies of the accessed data block. The central processing unit 11-2, however, only reads the accessed data block (see "BUFFER INVALIDATION ADDRESS INFORMATION DOES NOT SEND TO BUFFER MEMORIES" in FIG. 2, and also see FIG. 3A).

In the above-mentioned multiprocessor system to which the known method for achieving buffer memory coincidence is applied (please refer to FIGS. 1, 2 and 3A through 3C), there exists the previously described undesirable problem. That is, referring to FIG. 3C, when one of the central processing units, for example, the central processing unit 11-1, sends a request for writing or reading a data block to the intermediate buffer memory 13, but the accessed data block cannot be found therein, the memory 13 will then determine which data block is to be replaced therefrom to the main memory 14 in order to move this accessed data block into the memory 13 from the memory 14. In this case, the address of the replaced data block is sent as buffer invalidation address information from the memory 13 to the buffer memories 15-0, 15-1, . . . , 15-m in accordance with the statuses of the copy flags 33. Copies of the replaced data block are next erased from the respective buffer memories 15-0, 15-1, . . . , 15-m. However, if a copy of the replaced data block stored in, for example, the buffer memory 15-1, which copy has been erased by now, has been utilized very frequently by the central processing unit 11-1, then the technique is, of course, not very preferable because the central processing unit 11-1 must again fetch the corresponding data block again from the main memory 14 and store this in both the memory 13 and the memory 15-1, in spite of the fact that this data block is utilized very frequently.

According to the present invention, a method and system for achieving buffer memory coincidence can prevent the above-mentioned undesirable problem from occurring and can also provide some other advantages which will become apparent from the ensuing description. The essential features of the present invention are as follows:

firstly, the buffer invalidation address information is not sent from the intermediate buffer memory 13 although a certain data block is replaced therefrom;

secondly, each of the buffer memories 15-0 through 15-m can store data blocks which are not stored in the intermediate buffer memory 13;

lastly, the operation for performing the replacement of a data block from the memory 13 can be simplified.

The present invention will be clarified with reference to FIGS. 4, 5A, 5B, 6A through 6D, 7A, 7B, 8 and 9. The central processing units 11-0, 11-1 through 11-m, and the buffer memories 15-0, 15-1 through 15-m shown in FIG. 4 have already been explained. The reference numeral 41 represents a tag used in the present invention, which generally corresponds to the tag 31 shown in FIGS. 3A through 3C. The reference numeral 42 represents a supervising information memory area. The area 42 is comprised of copy flags 43-0, 43-1 through 43-m, an upper address information area 44, and a validity indication flag 45 (explained hereinafter). The tag 41 is contained in the intermediate buffer memory 13 (as shown in FIGS. 1 and 3, but not in FIG. 4) of the present invention. Furthermore the main memory 14 (FIG. 1 and FIGS. 3A through 3C) is also not shown in FIG. 4.

FIG. 5A is a flow diagram indicating the steps of a method for achieving buffer memory coincidence, especially the steps for producing buffer invalidation address (BIA) information. FIG. 5B is also a flow diagram indicating the steps of the method for achieving buffer memory coincidence, especially the steps for processing the copy flags 43-0, 43-1 43-m and the validity indication flag 45 both shown in FIG. 4.

The method and system of the present invention will now be explained by referring to FIGS. 4, 5A, 5B and 6A through 6D. In FIGS. 6A through 6D, intercommunication between the intermediate buffer memory 63 and the buffer memories 15-0, 15-1 through 15-m is supervised by a Store-Through control method. Under the Store-Through control method, when one central processing unit, for example, unit 11-1, provides a request for writing a data block to its buffer memory 15-1, this request is also sent simultaneously to the intermediate buffer memory 63. As a result, the memory 63 can always store updated data blocks. On the other hand, intercommunication between the intermediate buffer memory 63 and the main memory 14 is supervised by a Swap control method. Under the Swap control method, each time that requested data is not found in intermediate buffer memory 63, a particular updated data block is moved from the intermediate buffer memory 63 to the main memory 14 due to replacement of this data block, and the corresponding data block in the main memory 14 is updated. As a result, the operation for achieving intercommunication between the memories 63 and 14 can be simplified.

Firstly, the intermediate buffer memory 63 receives a request for access from a particular central processing unit, for example, unit 11-1 (see "REQUEST FOR ACCESS TO INTERMEDIATE BUFFER MEMORY" in FIG. 5A). If the request for access is not a request for writing a data block but a request for reading a data block (see "NO" of "IS IT REQUEST FOR WRITING?" in FIG. 5A) the buffer invalidation address information is not sent to any of the buffer memories 15-0, 15-1 . . . 15-m (refer to FIG. 6A and see "BUFFER INVALIDATION ADDRESS INFORMATION DOES NOT SEND TO BUFFER MEMORIES" in FIG. 5A).

Thereafter, if the request for access is a request for writing a data block (see "YES" of "IS IT REQUEST FOR WRITING?" in FIG. 5A), if the accessed data block is found in the intermediate buffer memory 63 (see "YES" of "IS ACCESSED DATA BLOCK FOUND?" in FIG. 5A), and, furthermore, if the validity indication flag 45 (FIGS. 4, 6A through 6D) indicates a validity, that is, the logic of the flag 45 is now "1" (see "YES" of "DOES VALIDITY INDICATION FLAG INDICATE VALIDITY?" in FIG. 5A), then the buffer invalidation address (BIA) information is sent to buffer memories in accordance with the statuses of copy flags 43-0, 43-1 . . . 43-m (FIGS. 4, 6A through 6D). The logic "1" of the copy flag, for example, the copy flag 43-0, indicates that a copy of the accessed data block is stored in a corresponding buffer memory 15-0; accordingly, the buffer invalidation address information is sent to the memory 15-0 (see "BUFFER INVALIDATION ADDRESS INFORMATION IS SENT TO BUFFER MEMORIES OTHER THAN BUFFER MEMORY OF ACCESSING CENTRAL PROCESSING UNIT IN ACCORDANCE WITH STATUSES OF COPY FLAGS" in FIG. 5A, and refer to FIG. 6B). The above-mentioned validity indication flag 45 indicates, when the bit of this flag 45 is logic "1", that all the copy flags 43-0, 43-1 . . . 43-m are valid; accordingly, the status of each copy flag is correct. On the contrary, when the bit of the flag 45 is logic "0", this flag 45 indicates that all of the flags 43-0, 43-1 . . . 43-m may be invalid; accordingly, the status of each copy flag may be incorrect. The reason that the validity indication flag is employed in the method of the present invention will now be explained. In FIG. 5A, the step of "SET OR RESET STATUS OF COPY FLAG WITH REGARD TO ACCESSING CENTRAL PROCESSING UNIT IN ACCORDANCE WITH CONDITION OF WHETHER ACCESSED DATA BLOCK HAS BEEN FOUND OR HAS NOT BEEN FOUND IN BUFFER MEMORY THEREOF AND ALSO RESET ALL REMAINING COPY FLAGS)" follows after the step of "BUFFER INVALIDATION ADDRESS INFORMATION IS SENT TO BUFFER MEMORIES OTHER THAN BUFFER MEMORY OF ACCESSING CENTRAL PROCESSING UNIT IN ACCORDANCE WITH STATUSES OF COPY FLAGS", which step is schematically shown in FIG. 6C. Since intercommunication between the buffer memories 15-0 through 15-m and the intermediate buffer memory 63 is supervised by the Store-Through control method, when one of the central processing units 11-0 through 11-m provides a request for writing a data block, this data block in the corresponding buffer memory thereof must also be rewritten if the data block is stored therein, and, simultaneously, the request for writing the data block is sent further to the memory 63. If the same data block is found in the memory 63, the corresponding data block stored in the memory 63 will be rewritten. On the contrary, if the same data block is not found in the buffer memory of the accessing central processing unit but is found in the memory 63, then the same data block stored in the memory 63 will be rewritten only, and the same data block will not be stored in the buffer memory of the accessing central processing unit. Consequently, the copy flag of this buffer memory must be set or reset in accordance with the condition of whether the same data block has been or has not been found in this buffer memory.

In FIG. 6B, when the central processing unit, for example, the unit 11-1, provides a request for writing a data block, and furthermore, when this accessed data block to be written is found in the intermediate buffer memory 63, then the content of the supervising information memory area 42 corresponding to this accessed data block to be written is read out. Since the flag 45 now indicates the validity of copy flags 43-0, 43-1 . . . 43-m, the buffer invalidation address information is sent only to those buffer memories having respective copy flags of logic "1". Contrary to this, in FIG. 6D, when the accessed data block is not found in the intermediate buffer memory 63 (see "NO" of "IS ACCESSED DATA BLOCK FOUND?" in FIG. 5A), the step of "BUFFER INVALIDATION ADDRESS INFORMATION IS SENT TO ALL BUFFER MEMORIES OTHER THAN BUFFER MEMORY OF ACCESSING CENTRAL PROCESSING UNIT" in FIG. 5A follows thereafter. After completion of this step, the specified certain data block is replaced from the intermediate buffer memory 63 in order to move the accessed data block into the memory 63 from the main memory 14 (see "SPECIFIED CERTAIN DATA BLOCK IS REPLACED FROM INTERMEDIATE BUFFER MEMORY" in FIG. 5A). The accessed data block, which is moved into the intermediate buffer memory 63, is located at the portion where the replaced data block was originaly located. Suppose that the address of the accessed data block is ⓐ and also that the corresponding data block is not found at this address ⓐ, then the buffer invalidation address information is sent to all of the buffer memories other than the buffer memory of the accessing central processing unit (please refer to FIG. 6D). At the same time, suppose that the address of the certain data block to be replaced from the memory 63 is ⓑ. Then, the data block stored at this address ⓑ is moved to the main memory 14, and the data block stored at the address ⓐ of the main memory 14 is moved into the memory 63. In this case, it should be noted that, even though the data block of the address ⓑ exists in any of the buffer memories, the data block in each of these buffer memories is not invalidated in the case where the buffer invalidation address (BIA) information is not sent from the memory 63. At the same time, only one of the copy flags of the data block which has been moved into the memory 63, which copy flag corresponds to the accessing central processing unit, is set (changed to logic "1") or reset (changed to logic "0") in accordance with the condition of whether or not the accessed data block has been found in the buffer memory of this accessing central processing unit (refer to FIG. 6D and see the step of "SET OR RESET COPY FLAG OF ACCESSING CENTRAL PROCESSING UNIT IN ACCORDANCE WITH CONDITION OF WHETHER MOVED-IN DATA BLOCK HAS BEEN OR HAS NOT BEEN FOUND IN BUFFER MEMORY OF ACCESSING CENTRAL PROCESSING UNIT, AND ALSO RESET ALL REMAINING COPY FLAGS" in FIG. 5A).

In the case where the accessed data block is found in the intermediate buffer memory 63 (see "YES" of the step of "IS ACCESSED DATA BLOCK FOUND?" in FIG. 5A), but the validity indication flag indicates that all of the copy flags are invalid (see "NO" of the step of "DOES VALIDITY INDICATION FLAG INDICATE VALIDITY?" in FIG. 5A), the buffer invalidation address information is sent to all buffer memories other than the buffer memory of the accessing central processing unit (refer to FIG. 6C and see "BUFFER INVALIDATION ADDRESS INFORMATION IS SENT TO BUFFER MEMORIES OTHER THAN BUFFER MEMORY OF ACCESSING CENTRAL PROCESSING UNIT" in FIG. 5A). After this, the validity indication flag is reset to logic "1" which indicates that all of the copy flags are valid (see "VALIDITY INDICATION FLAG IS SET" in FIG. 5A). Then, the copy flag of the accessing central processing unit is set (changed to logic "1") or reset (changed to logic "0") in accordance with the condition of whether or not the accessed data block has been found in the buffer memory of this accessing central processing unit, and all of the remaining copy flags are also reset (changed to logic "0").

The reason for employing the validity indication flag 45 (FIGS. 4, 6A through 6D) in the present invention is as follows. When one of the central processing units, for example, the unit 11-1 (FIGS. 6A through 6D), provides a request for reading a data block to the intermediate buffer memory 63, but the data block to be read is not found therein, then a certain data block is replaced therefrom and the data block to be read is moved into the memory 63 from the main memory 14. In this case, it is not clear whether a copy of this data block which has been moved into the memory 63 still exists in any of the buffer memories 15-0, 15-1 through 15-m. That is, there is the possibility that a copy of this moved-in data block does exist in any of the buffer memories, for example, buffer memory 15-m, other than the buffer memory of the accessing central processing unit 11-1. If a copy of this moved-in data block exists in any of the other buffer memories, but only a copy flag of the buffer memory of the accessing central processing unit has been set (changed to logic "1") and other copy flags have been reset (changed to logic "0"), then the other copy flags are invalid because the buffer memory 15-m still stores a copy of this moved-in data block. Accordingly, if any of the copy flags is invalid, then the validity indication flag 45 must be reset (changed to logic "0") to indicate that at least one of the copy flags may not be correct. For example, when the central processing unit 11-1 provides a request for reading a data block A, but this data block A cannot be found in the memory 63, then the data block A is moved into the memory 63 and is also stored in the buffer memory 15-1. Thereafter, for example, when the central processing unit 11-m provides a request for reading a data block B, but this data block B cannot be found in the memory 63, then replacement of data blocks occurs in the memory 63. In the case where the data block A is replaced therefrom, in order to move the data block B into the memory 63 from the memory 14, and the central processing unit 11-0 provides a request thereafter for reading the data block A, this data block A must be moved into the memory 63 from the main memory 14. At this time, the central processing unit 11-0 cannot provide information as to whether or not the buffer memory 15-1 has a copy of the data block A stored therein, although this data block A is not found in the memory 63. Therefore, the copy flag of the buffer memory 15-1 which is now logic "0" is incorrect. Accordingly, the validity indication flag 45 must be reset (changed to logic "0") to indicate that at least one of the copy flags is incorrect.

The condition for setting the validity indication flag 45 (changed to logic "1") is as follows. For example, when the central processing unit 11-1 provides a request for writing a data block, the buffer invalidation address information is then sent to all buffer memories other than the buffer memory 15-1; in the case where the data block to be written is not found in the memory 63, or in the case where the data block to be written is found, the validity indication flag 45 is set to logic "1". When the data block is found in the memory 63 and the validity indication flag 45 thus indicates validity, the buffer invalidation address information is then sent to buffer memories having copies of the corresponding data block. In any event, when a request for writing a data block is provided from any one of the central processing units, then the validity indication flag 45 is set (changed to logic "1").

Contrary to this, when an accessed data block is moved into the memory 63 in accordance with a request for reading this data block, the validity indication flag 45 is then reset (changed to logic "0"), which indicates that at least one of the copy flags may not be correct.

FIG. 5B is a flow diagram indicating the steps of the method for achieving buffer memory coincidence, especially the steps for processing the above-mentioned copy flags and the validity indication flag. In FIG. 5B, the step of "REQUEST FOR ACCESS TO INTERMEDIATE BUFFER MEMORY" occurs first. The step of "IS ACCESSED DATA BLOCK FOUND IN INTERMEDIATE BUFFER MEMORY?" occurs thereafter. If the result is "NO", the third step of "ACCESSED DATA BLOCK IS MOVED INTO INTERMEDIATE BUFFER MEMORY" will occur. Contrary to this, if the result of the second step is "YES", then the fourth step of "IS IT REQUEST FOR WRITING OR READING?" will follow. If the result of the fourth step is "READ", then the fifth step of "COPY FLAG OF BUFFER MEMORY OF ACCESSING CENTRAL PROCESSING UNIT IS SET" will occur. Contrary to this, if the result of the fourth step is "WRITE", then the sixth step of "SET OR RESET COPY FLAG OF BUFFER MEMORY OF ACCESSING CENTRAL PROCESSING UNIT IN ACCORDANCE WITH CONDITION OF WHETHER ACCESSED DATA BLOCK HAS BEEN FOUND OR HAS NOT BEEN FOUND IN THIS BUFFER MEMORY AND COPY FLAGS OF BUFFER MEMORIES OF REMAINING CENTRAL PROCESSING UNITS ARE RESET" will occur. Subsequently, the seventh step of "SET VALIDITY INDICATION FLAG" will occur.

On the other hand, if the result of the second step of "IS ACCESSED DATA BLOCK FOUND IN INTERMEDIATE BUFFER MEMORY?" is "NO", then the third step of "ACCESSED DATA BLOCK IS MOVED INTO INTERMEDIATE BUFFER MEMORY" will occur. The eighth step of "IS IT REQUEST FOR WRITING OR READING?" will occur next. If the result of the eighth step is "WRITE", then the ninth step of "SET OR RESET COPY FLAG OF BUFFER MEMORY OF ACCESSING CENTRAL PROCESSING UNIT IN ACCORDANCE WITH CONDITION OF WHETHER ACCESSED DATA BLOCK HAS BEEN OR HAS NOT BEEN FOUND IN THIS BUFFER MEMORY, AND RESET COPY FLAGS OF BUFFER MEMORIES OF REMAINING CENTRAL PROCESSING UNITS" occurs. Contrary to this, if the result of the eighth step is "READ", a tenth step of "COPY FLAG OF BUFFER MEMORY OF ACCESSING CENTRAL PROCESSING UNIT IS SET AND VALIDITY INDICATION FLAG IS RESET" occurs.

In the above explanation, the copy flag of the buffer memory of the accessing central processing unit, is set or reset in accordance with the condition of whether or not the accessed data block has been found in this buffer memory. However, the following step can also be employed, i.e., the copy flag can be set unconditionally when a request for writing is directed to a data block which is found in intermediate buffer memory or when a data block is moved into the intermediate buffer memory under the provision of a request for writing.

The above explanation concerns the utilization of the validity indication flag; however, another step can also be employed, as follows. When a data block is moved into the intermediate buffer memory under the provision of a request for reading, then all of the copy flags regarding this accessed data block can be set without utilizing the validity indication flag.

The advantages of the present invention are as follows. Firstly, the buffer invalidation address information is not sent to the buffer memories when a certain data block is replaced in the intermediate buffer memory. According to the known method, the buffer invalidation address information must be sent to buffer memories having copies of the replaced data block in accordance with copy flags. Specifically, if the known method is employed, the step represented by symbol *1 in FIG. 2 must be inserted between the steps represented by symbols *2 and *3 in FIG. 5A. As a result of the present invention, however, since the buffer invalidation address information regarding the replaced data block from the intermediate buffer memory is not sent to the buffer memories, it is then possible to store data blocks in the buffer memories. Accordingly, the data blocks are replaced and not stored in the intermediate buffer memory. Thus a memory capacity pattern, as shown in FIG. 7A can be created in the buffer memory. In FIG. 7A, the square M denotes memory space occupied by main memory, the circles B1, B2 . . . Bm represent memory information of the buffer memories 15-0, 15-1 . . . 15-m, respectively, and the circle I represents a memory information of the intermediate buffer memory 63, according to the present invention. Conversely, in the known method, referring to FIG. 7B, memory informations B1, B2 . . . B3 are entirely enclosed in a memory information I' of the intermediate buffer memory 13, because, in the known method, the intermediate buffer memory 13 and the buffer memories 15-0, 15-1 through 15-m are supervised under the condition that the data blocks stored in at least one of the buffer memories must also be stored in the intermediate buffer memory. As is apparent from FIGS. 7A and 7B, the total memory capacity of the multiprocessor system according to the present invention (FIG. 7A) is substantially expanded over the prior art (FIG. 7B). In addition to this, an aforementioned undesirable problem is eliminated by utilizing the method of the present invention. That is, if replacement occurs in the intermediate buffer memory, which is utilized very frequently in any of the central processing units, and a certain specified data block is thus replaced therefrom, this data block will not be erased by the buffer invalidation address information.

Secondly, even though replacement occurs in the intermediate buffer memory, it is not necessary to send the buffer invalidation address information to selected buffer memories in accordance with the statuses of the copy flags, as usually occurs in the known method. Accordingly, the replacement control process utilized in accordance with the present invention is relatively simplified when compared to the replacement control process utilized in accordance with the known method.

In the prior art (FIG. 7B), when some CPU fetches a desired data block from the main memory and stores it in buffer memory in accordance with a reading access request and, at the same time, some data block is replaced from the intermediate buffer memory, the corresponding data block is erased from each of the buffer memories of the CPUs but not from the requesting CPU. Therefore, the memory spaces B1, B2 . . . Bm are always contained inside the memory space I'. That is, each of the buffer memories cannot store the data blocks if the data blocks are not stored in the intermediate buffer memory.

In contrast, in the present invention (FIG. 7A), when some CPU fetches a desired data block from the main memory into buffer memory in accordance with a request for a reading access, the identical data block is also stored in the intermediate buffer memory. However, when a data block is replaced from the intermediate buffer memory, even though the copy of the corresponding data block is stored in the buffer memory, this data block is not erased from this buffer memory. Thus, it is possible to store data blocks which exist only in a buffer memory but do not exist in the intermediate buffer memory. This is illustrated by the portions of memory spaces B1, B2 . . . Bm which are located outside memory space I. As a result, the total and effective memory space of FIG. 7A is larger than that of FIG. 7B.

In order to achieve the above-mentioned advantages, it is necessary to employ a step represented by the symbol *4 in FIG. 5A. A step similar to this step *4 is not shown in FIG. 2. However, it is a drawback (which is insignificant, however, as will be seen below) of the present invention to include such step *4. The reason that such step *4 must be included in the present invention is that it is not guaranteed that copies of the replaced data block from the intermediate buffer memory are always erased from the buffer memories. In other words, the total memory capacity is substantially expanded since such guarantee does not exist in the present invention, as shown in FIG. 7A. However, it should be noted that the probability of step *4 occurring during operation is very small, because step *4 occurs only when the accessed data block to be written is not found in the intermediate buffer memory. Usually, such "not found case" occurs with a probability of, for example, about 5%, while a "found case" occurs with a probability of, for example, about 95%. Accordingly, the above-mentioned drawback may be insignificant.

FIG. 8 is a block diagram showing a detailed example of the intermediate buffer memory 63 shown in FIGS. 6A through 6D, according to the system of the present invention. In FIG. 8, the reference numerals 81-1 through 81-p respectively represent address arrays, 82-1 through 82-p represent copy flags each including the validity indication flag, 83-1 through 83-p represent data arrays, 84-1 through 84-p represent address comparators, 85 represents a flag selector, 86 represents a flag register, 87 represents a data selector, 88-1 through 88-4 and 88-M represent data registers. The tag 41 shown in FIGS. 4 and 6A through 6D is comprised of the members recited above except for the members 83-1 through 83-m, 86, 87, 88-1 through 81-4 and 88-M. In this example, there are four central processing units 11-1 through 11-4 and four address registers 91-1 through 91-4. All four registers are connected to an address selector 92, and a selected address register 93 is connected thereto. Four data registers 94-1 through 94-4 are provided because there are four central processing units 11-1 through 11-4. A data register 94-M is connected to the main memory 14. The registers 94-1 through 94-4 and 94-M are connected to a data selector 99. The reference numeral 100 represents a logic circuit for producing the buffer invalidation address (BIA) information. The logic circuit 100 is a very important member for carrying out the method of the present invention. Details of this logic circuit 100 will be explained with reference to FIG. 9. The operation of the intermediate buffer memory 63 shown in FIG. 8 is as follows. Each address information for accessing the intermediate buffer memory 63 is applied from the central processing units 11-1 through 11-4 to the address registers 91-1 through 91-4, respectively. A conventional priority taker 95 determines which address information should be selected first. After selection, the selected address information is transferred to and stored in the selected address register 93. This register 93 provides the upper address U (see the upper address information area 44 in FIG. 4) and a set address S. The set address S may be a lower address with respect to the upper address S. However, the set address S is changeable in accordance with the variation of the upper address U for the purpose of uniformly utilizing the entire memory area. The addresses U and S retrieve the address arrays 81-1 through 81-p, the copy flags 82-1 through 82-p, and the data arrays 83-1 through 83-p. The address comparators 84-1 through 84-p compare upper addresses derived, respectively, from the address arrays 81-1 through 81-p with the upper address U. If the accessed address hits, for example, a level "p", then a hit signal P is produced from the address comparator 84-p. Thereafter, the copy flag 82-p and the data array 83-p are selected, by the hit signal P, by means of the flag selector 85 and the data selector 87, respectively. Thus, the flag register 86 stores the validity indication flag information of the corresponding data block in an area V and at the same time stores each copy flag information of this data block regarding central processing units 11-1 through 11-4, respectively in an area "COPY". The copy flags (refer to 43-1 through 43-3 in FIGS. 4 and 6A through 6D) and the validity indication flag (refer to 45 in the same Figures) are applied to the logic circuit 100. The outputs from the address comparators 84-1 through 84-p are applied to the logic circuit 100 through an OR-gate 98. The output from the OR-gate 98 corresponds to Found/Not Found indication information. The term "Found" means, as previously mentioned, that the accessed data block is found in the intermediate buffer memory 63. On the contrary, the term "Not Found" means, as previously mentioned, that the accessed data block is not found therein. The logic circuit 100 further receives information Q from the priority taker 95, which information indicates the serial number of the accessing central processing unit. The logic circuit 100 also receives information R from the address selector 92. The output from the address selector 92 also indicates information R which shows that a request for accessing the memory 63 is not a request for reading a data block but a request for writing a data block. When information R is being produced, a write data block is transferred from the accessing central processing unit and stored in the corresponding data register (94-1, 94-2, 94-3 or 94-4). Then the data block is written in the accessing data array (83-1, 83-2, 83-3 or 83-4). If the accessing central processing unit provides a request for reading a data block, then a corresponding read data block is transmitted from the corresponding data register (88-1, 88-2, 88-3 or 88-4). When the above-mentioned replacement occurs in the memory 63, the data block to be moved into this memory 63 is supplied from the main memory 14 and momentarily stored in the data register 94-M. At the same time, the particular data block to be moved out from the memory 63 to the main memory 14 is momentarily stored in the data register 88-M.

In FIG. 8, the logic circuit 100 for producing the buffer invalidation address (BIA) information operates in accordance with the following logical expression:

$$\text{BIA GO } \#i = \overline{\text{REQ.CPU}} \times W \times \{\overline{F}\vee F \times (\overline{VIF} \vee \text{COPY}\#i)\}$$

In the above expression, the term "BIA GO #i" indicates that each output, which corresponds to the buffer invalidation address information, of the logic circuit 100 (shown in FIG. 8) must be sent to the i-th central processing unit, where i=1, 2, 3 or 4. The term "$\overline{\text{REQ.CPU}}$" indicates that the i-th central processing unit is a central processing unit which does not provide a request for accessing the intermediate buffer memory because it is not necessary to send the buffer invalidation address information to a buffer memory of an accessing i-th central processing unit. The term "W" indicates that the i-th central processing unit provides a request for writing a data block to the intermediate buffer memory. The term "$\overline{F}$" indicates that the accessed data block is not found in the intermediate buffer memory. The term "F" indicates that the accessed data block is found in the intermediate buffer memory. The term "$\overline{VIF}$" indicates that the validity indication flag designates an invalidity of copy flags. The term "COPY #i" indicates that the copy flag of the buffer memory of the i-th central processing unit is logic "1". Furthermore, the symbol "x" represents a logical product (AND). The symbol "v" represents a logical sum (OR). The term "BIA GO #i" is produced (a) when the i-th central processing unit is not an accessing central processing unit, that is, when "$\overline{\text{REQ.CPU}}$" is true, and (b) when the central processing unit provides a request for writing a data block, that is, when "W" is true, and (c) when the expression $$\{\overline{F}\vee F \times (\overline{VIF} \vee \text{COPY }\#i)\}$$

is satisfied. The expression $\{\overline{F} \times (\overline{VIF}\vee \text{COPY }\#i)\}$ is satisfied (d) when the accessed data block is not found, that is, "$\overline{F}$" or (e) when the expression "$F \times (\overline{VIF} \vee \text{COPY }\#i)$" is satisfied. This expression (e) is satisfied (f) when the accessed data block is found ("F") and (g) when the expression $\overline{VIF} \vee \text{COPY }\#i$ is satisfied. This expression (g) is satisfied (h) when the validity indication flag indicates that the copy flags may be invalid, that is, when VIF is true, or when a copy of this data block is stored in the buffer memory of the i-th central processing unit, that is, when "COPY #i" is true. These expressions (a) through (h) have already been mentioned above with reference to the flow diagrams shown in FIGS. 5A and 5B.

As mentioned above, the logic circuit 100 of FIG. 8 operates in accordance with the logical expression of $\text{BIA GO }\#i = \overline{\text{REQ.CPU}} \times W \times \{\overline{F} \vee F \times (\overline{VIF} \vee \text{COPY}$ i){. Therefore, the logic circuit 100 can be constructed by utilizing, for example, the gate circuits shown in FIG. 9. It should be noted that, in the logic circuit 100 shown in FIG. 8, there are four similar gate circuits shown in FIG. 9 with respect to four central processing units 11-1 through 11-4, respectively. In FIG. 9 the symbol INV represents an inverter, the symbols O1, O2 respectively represent OR-gates, and the symbols A1, A2 respectively represent AND-gates. The term "REQ.CPU" is an inversion of "REQ.CPU" shown in the above logical expression. In FIG. 8, the term "REQ CPU" is represented by information Q. The term "W" appearing in FIG. 9 is the same as the term "W" shown in the above logical expression, which "W" corresponds to information R shown in FIG. 8. Terms "F" and "F" appearing in FIG. 9 are the same as the terms "F" and "F" shown in the above logical expression, which "F" and "F" correspond to the output ofrom the OR-gate 98 shown in FIG. 8. The term "VIF" appearing in FIG. 9 is the same as the term "VIF" shown in the above logical expression, which VIF corresponds to logic "0" of the area v in the flag register 86 shown in FIG. 8. The term "COPY #i" appearing in FIG. 9 is the same as the term "COPY #i" shown in the above logical expression, which "COPY #i" corresponds to the i-th bit in the area "COPY" of the flag register 86 shown in FIG. 8. Thus, in FIG. 8, the "BIA GO" outputs, which correspond to logic "1" or "0", are produced from the logic circuit 100, and are applied to a first input of a corresponding one of the AND-gates 97-1 through 97-4. The buffer invalidation address (BIA) is the same as the address of the data block to be written. Accordingly, this address is supplied from the address selector 92 and stored in an address register 96. The output of register 96 is commonly supplied to second inputs of the AND-gates 97-1 through 97-4. For example, if the BIA GO #3 becomes logic "1", then the AND-gate 97-3 opens and, at the same time, the buffer invalidation address, that is, the address stored in the address register 96, is sent to the 3rd central processing unit 11-3.

As mentioned hereinbefore, a multiprocessor system to which the method and system of the present invention is applied can produce various kinds of advantages.

Numerous modifications and adaptations of the system and method of the invention will be apparent to those skilled in the art and thus it is intended by the appended claims to cover all such modifications and adaptations which fall within the true spirit and scope of the invention.

What is claimed is:

1. A method for achieving buffer memory coincidence in a multiprocessor system comprising the steps of:

providing a plurality of central processing units, a plurality of buffer memories, one for each central processing unit, each buffer memory being contained in a respective one of said central processing units, a main memory commonly utilized by said central processing units, and an intermediate buffer memory operatively connected between said main memory and said buffer memories, said intermediate buffer memory having a plurality of data block memory areas for storing respective corresponding data blocks, and a plurality of supervising information memory areas, one for each data block memory area, each supervising information memory area being coupled to a respective corresponding one of said data block memory areas, each supervising information memory area storing supervising information indicating whether or not a copy of one of said respective corresponding data blocks stored in said respective corresponding one of said data block memory areas is stored in each of said buffer memories;

detecting when one of said central processing units provides a request for accessing a data block in said intermediate buffer memory;

detecting whether or not said request is a request sent to said intermediate buffer memory for writing a data block;

if said request is a request for writing a data block, detecting whether or not the accessed data block is found in said intermediate buffer memory;

if said accessed data block is not found in said intermediate buffer memory, sending buffer invalidation address information to all of said buffer memories other than the buffer memory contained in the accessing central processing unit, said buffer invalidation address information having an address identical to the address of said accessed data block;

if said accessed data block is found in said intermediate buffer memory, sending said buffer invalidation address information only to selected ones of said buffer memories, said selected ones of said buffer memories being determined by said intermediate buffer memory in accordance with said supervising information.

2. A method as set forth in claim 1, wherein said method further includes the step of:

if said request to said intermediate buffer memory is a request for reading a data block, inhibiting the sending of buffer invalidation address information to any of the buffer memories.

3. A method as set forth in claim 1 wherein intercommunication between said each buffer memory and said intermediate buffer memory is supervised by a Store-Through control method.

4. A method as set forth in claim 1, wherein intercommunication between said intermediate buffer memory and said main memory is supervised by a Swap control method.

5. A method as set forth in claim 1, wherein each of said supervising information areas comprises a copy flag portion for holding copy flags and a validity indication portion for holding a validity indication flag, each of said copy flags indicating, when set to a first given status, that a corresponding buffer memory stores a copy of an accessing data block, and said validity indication flag indicating, when said validity indication flag is set to a first given status, that corresponding copy flag indications are correct.

6. A method as set forth in claim 5, wherein said copy flags, when set to a second given status, indicate that the corresponding data block is not found in said intermediate buffer memory.

7. A method as set forth in claim 5, comprising the additional step of setting said validity indication flag to said first given status when said accessing central processing unit provides a request for writing a data block to the corresponding data block in said intermediate buffer memory, when said accessed data block is found in said intermediate buffer memory, and when said validity indication flag is not set to said first given status.

8. A method as set forth in claim 7, comprising the additional step of sending said buffer invalidation address information to all of said buffer memories other than said buffer memory of said accessing central processing unit.

9. A method as set forth in claim 3, comprising the additional step of sending Found/Not Found information from said accessing central processing unit, when said unit provides a request to said intermediate buffer memory, for writing a data block, said Found/Not Found information indicating selectively that a corresponding data block has been found or has not been found in the buffer memory of said accessing central processing unit.

10. A method for achieving buffer memory coincidence in a multiprocessor system, comprising the steps of:

providing a plurality of central processing units, a plurality of buffer memories, one for each central processing unit, each buffer memory being contained in a respective one of said central processing units, a main memory commonly utilized by said central processing units, and an intermediate buffer memory;

checking in accordance with the contents of said intermediate buffer memory, the following six kinds of information: $\overline{REQ.CPU}$, W, $\overline{F}$, F, copy #1 and $\overline{VIF}$; and producing information of BIA GO #i indicating that buffer invalidation address information must be sent to the i-th (i=1,2,3 . . . ) central processing unit, in accordance with the logical expression:

$$BIA\ GO\ \#1 = \overline{REQ.CPU} \times W \times \{\overline{F} \vee F \times (COPY\ \#1 \vee \overline{VIF})\}$$

where the term "$\overline{REQ.CPU}$" indicates that the i-th central processing unit does not provide a request for accessing said intermediate buffer memory, the term "W" indicates that the above request is a request for writing a data block, the terms "F" and "$\overline{F}$" indicate that the accessed data block is found or is not found, respectively, in said intermediate buffer memory, the term "COPY #1" indicates a copy of a corresponding data block is stored in said buffer memory of said i-th central processing unit, the term $\overline{VIF}$ indicates the possibility that the copy flags may be invalid, and the symbols "x" and "v" represent a logical product and a logical sum, respectively.

11. A method for achieving buffer memory coincidence in a multiprocessor system, comprising the steps of:

(a) providing a plurality of central processing units, a main memory commonly utilized by said central processing units, a plurality of buffer memories, one for each central processing unit, each buffer memory being contained in a respective one of said central processing units, and an intermediate buffer memory operatively connected between said main memory and said buffer memories, said intermediate buffer memory having a plurality of data block memory areas for storing respective corresponding data blocks and a plurality of copy flags storage areas for holding copy flags, one for each buffer memory;

(b) detecting when one of said central processing units provides a request for accessing a data block in said intermediate buffer memory;

(c) detecting whether or not the accessed data block is found in said intermediate buffer memory;

(d) if said accessed data block is not found in said intermediate buffer memory, sending buffer invalidation address information to all buffer memories other than the buffer memory of the accessing central processing unit;

(e) if said accessed data block is found in said intermediate buffer memory, selectively setting or resetting said copy flag corresponding to said buffer memory of said accessing central processing unit in accordance with whether said accessed data block has been found or has not been found, respectively, in the buffer memory of said accessing central processing unit.

12. A method as set forth in claim 11, wherein step (a) includes the additional step of providing a validity indication flag storage area in said intermediate buffer memory for holding a validity indication flag indicating validity of said copy flags, and wherein said step (e) comprises the additional steps, if said accessed data block is found in said intermediate buffer memory, of:

determining whether or not said validity indication flag indicates validity of said copy flags, if said validity indication flag does not indicate validity of said copy flags, sending said buffer invalidiation address information to those buffer memories other than said buffer memory of said accessing central processing unit, and setting said validity indication flag to indicate validity of said copy flags.

13. A method as set forth in claim 11, wherein said step (d) comprises the additional steps of:

obtaining said accessed data block for storage in said intermediate buffer memory, specifying a given data block in said intermediate buffer memory to be replaced, replacing said given data block in said intermediate buffer memory with said accessed data block obtained for storage therein, and selectively setting or resetting said copy flag of said accessing central processing unit in accordance with whether said obtained data block has been found or has not been found, respectively, in said buffer memory of said accessing central processing unit.

14. A method for achieving buffer memory coincidence in a multiprocessor system, comprising the steps of:

(a) providing a plurality of central processing units, a main memory commonly utilized by said central processing units, a plurality of buffer memories, one for each central processing unit, each buffer memory being contained in a respective one of said central processing units, and an intermediate buffer memory operatively connected between said main memory and said buffer memories, said intermediate buffer memory having a plurality of data block memory areas for storing respective corresponding data blocks and a plurality of copy flags storage areas for holding copy flags, one for each buffer memory;

(b) detecting when one of said central processing units provides a request for accessing a data block in said intermediate buffer memory;

(c) detecting whether or not the accessed data block is found in said intermediate buffer memory;

(d) if said accessed data block is not found in said intermediate buffer memory, transferring said accessed data block into said intermediate buffer memory;

(e) determining whether or not said request for access is a writing or reading operation;

(f) if said request for access is a writing operation, selectively setting or resetting said copy flag of said buffer memory of said accessing central processing unit in accordance with whether said accessed data block has been found or has not been found, respectively, in said buffer memory of said accessing central processing unit;

(g) if said request for access is a reading operation, setting said copy flag of said buffer memory of said accessing central processing unit.

15. A method as set forth in claim 14, wherein said step (a) comprises the additional step of providing a validity indication flag storing portion in said intermediate buffer memory for storing a validity indication flag indicating validity of said copy flags, and wherein said step (f) comprises the additional steps of, if said request for access is a writing operation, resetting said copy flags of said buffer memories of said central processing units other than said accessing central processing unit to indicate that said accessed data block is not found in said central processing units other than said accessing central processing unit, and setting said validity indication flag to indicate that said copy flags are valid.

16. A method as set forth in claim 14, wherein said step (a) comprises the additional step of providing a validity indication flag storing portion in said intermediate buffer memory for storing a validity indication flag indicating validity of said copy flags, and wherein said step (g) comprises the additional step of, if said accessed data block is not found in said intermediate buffer memory, and if said request for access is a reading operation, resetting said validity indication flag to indicate that said copy flags are not valid.

17. A system for achieving buffer memory coincidence in a multiprocessor system, said multiprocessor system comprising a plurality of central processing units, a plurality of buffer memories, one for each central processing unit, each buffer memory being contained in a respective one of said central processing units, a main memory commonly utilized by said central processing units, and an intermediate buffer memory operatively connected between said main memory and said buffer memories, said intermediate buffer memory having a plurality of data block memory areas for storing respective corresponding data blocks, and a plurality of supervising information memory areas, one for each data block memory area, each supervising information memory area being coupled to a respective corresponding one of said data block memory areas, each supervising information memory area storing supervising information indicating whether or not a copy of said respective corresponding data block stored in said respective corresponding one of said data block memory areas is stored in each of said buffer memories; said system for achieving buffer memory coincidence comprising:

means for detecting when one of said central processing units provides a request for accessing a data block in said intermediate buffer memory;

means for detecting whether or not said request is a request sent to said intermediate buffer memory for writing a data block;

means for detecting, when said request is a request for writing a data block, whether or not said accessed data block is found in said intermediate buffer memory;

means for sending, when said accessed data block is not found in said intermediate buffer memory, buffer invalidation address information to all of said buffer memories other than the buffer memory contained in said accessing central processing unit, said buffer invalidation address information having an address identical to the address of said accessed data block;

means for sending, if said accessed data block is found in said intermediate buffer memory, said buffer invalidation address information only to selected ones of said buffer memories, said selected ones of said buffer memories being determined by said intermediate buffer memory in accordance with said supervising information.

18. A system as set forth in claim 17, wherein said system further comprises means for inhibiting, if said request to said intermediate buffer memory is a request for reading a data block, said transmission of said buffer invalidation address information to any of said buffer memories.

19. A system as set forth in claim 17, said system further comprising means for supervising intercommunication between said each buffer memory and said intermediate buffer memory in accordance with a Store-Through control operation.

20. A system as set forth in claim 17, said system further comprising means for supervising intercommunication between said intermediate buffer memory and said main memory in accordance with a Swap control operation.

21. A system as set forth in claim 17, wherein each of said supervising information areas comprises a copy flag portion for holding copy flags and a validity indication portion for holding a validity indication flag, each of said copy flags indicating, when set to a first given status, that a corresponding buffer memory stores a copy of an accessing data block, and said validity indication flag indicating, when said validity indication flag is set to a first given status, that corresponding copy flag indications are correct.

22. A system as set forth in claim 21, wherein said copy flags, when set to a second given status, indicate that the corresponding data block is not found in said intermediate buffer memory.

23. A system as set forth in claim 21, wherein said system comprises means for setting said validity indication flag to said first given status when said accessing central processing unit provides a request for writing a data block to the corresponding data block in said intermediate buffer memory, when said accessed data block is found in said intermediate buffer memory at the same time that said validity indication flag is not set to said first given status.

24. A system as set forth in claim 23, further comprising means for sending said buffer invalidation address information to all of said buffer memories other than said buffer memory of said accessing central processing unit.

25. A system as set forth in claim 19, further comprising means for sending Found/Not Found information from said accessing central processing unit, when said unit provides a request to said intermediate buffer memory, for writing a data block, said Found/Not Found information indicating selectively that a corresponding data block has been found or has not been found in the buffer memory of said accessing central processing unit.

26. A system for achieving buffer memory coincidence in a multiprocessing system, comprising a plurality of central processing units, a plurality of buffer memories, one for each central processing unit, each buffer memory being contained in a respective one of said central processing units, a main memory commonly utilized by said central processing units, and an intermediate buffer memory; said system further comprising:

means for checking, in accordance with said intermediate buffer memory, for the following logical conditions: $\overline{REQ.CPU}$, W, F, $\overline{F}$, copy #i and $\overline{VIF}$; and means for producing information BIA GO #i, indicating that a buffer invalidation address information must be sent to the i-th (i = 1, 2, 3 ... ) central processing unit, in accordance with conditions corresponding to the following logical expression:

$$\text{BIA GO } \#i = \overline{REQ.CPU} \times W \times (\overline{F} \vee F \times (COPY\#i \vee \overline{VIF}))$$

where the term "$\overline{REQ.CPU}$" indicates that the i=th central processing unit does not provide a request for accessing said intermediate buffer memory, the term "W" indicates that the above request is a request for writing a data block, the terms "F" and "$\overline{F}$" indicate that the accessed data block is found or is not found, respectively, in said intermediate buffer memory, the term "COPY #i" indicates that a copy of a corresponding data block is stored in said buffer memory of said i-th central processing unit, the term $\overline{VIF}$ indicates the possibility that at least one of the copy flags is invalid, and the symbols "X" and "v" represent a logical product and a logical sum, respectively.

* * * * *

UNITED STATES PATENT AND TRADEMARK OFFICE
CERTIFICATE OF CORRECTION

PATENT NO. : 4,290,103
DATED : September 15, 1981
INVENTOR(S) : Hattori

Page 1 of 4

It is certified that error appears in the above—identified patent and that said Letters Patent is hereby corrected as shown below:

Front page, [57] ABSTRACT, lines 15 and 16, the equation should read

-- BIA 60 $\#i=\overline{REQ \cdot CPU} \times W \times \{\overline{FvFx}(COPY\#iv\ \overline{VIF})\}$ ;

line 17, change "$\overline{REQ.CPU}$" to -- $\overline{REQ \cdot CPU}$ --;

line 21, change "term" to -- terms --;

line 28, change "υ" to -- "v" --;

Column 1, between lines 15 and 16, insert
      -- 2. Description of the Prior Art --.

Column 3, lines 35 and 42, change "CUPs" to --CPUs --;

between lines 45 and 46, insert

-- BRIEF DESCRIPTION OF THE DRAWINGS --;

line 58, after "5A(2)" insert -- , --;

line 62, after "5A(1)" insert -- , --.

Figure 1:
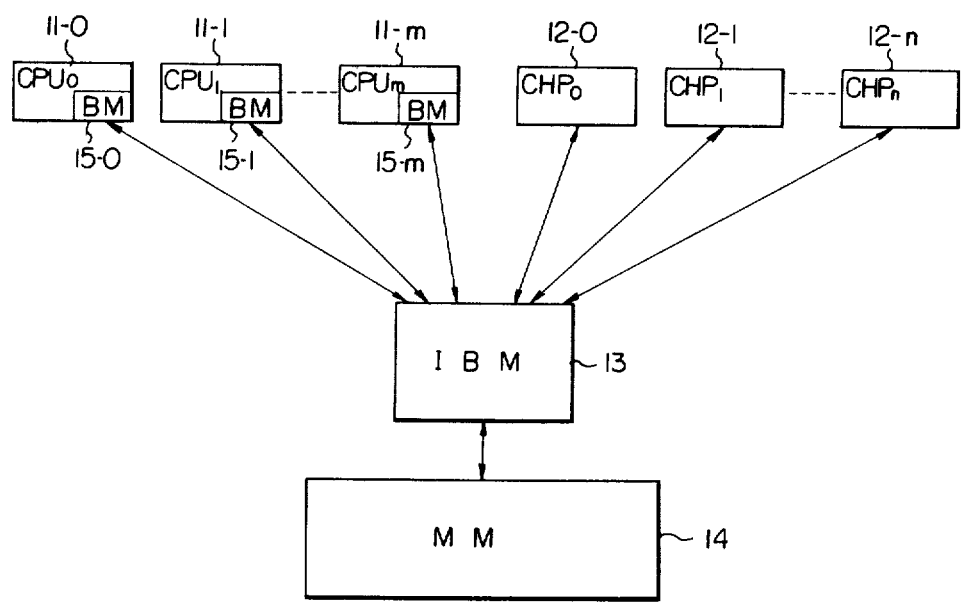
Figure 2:
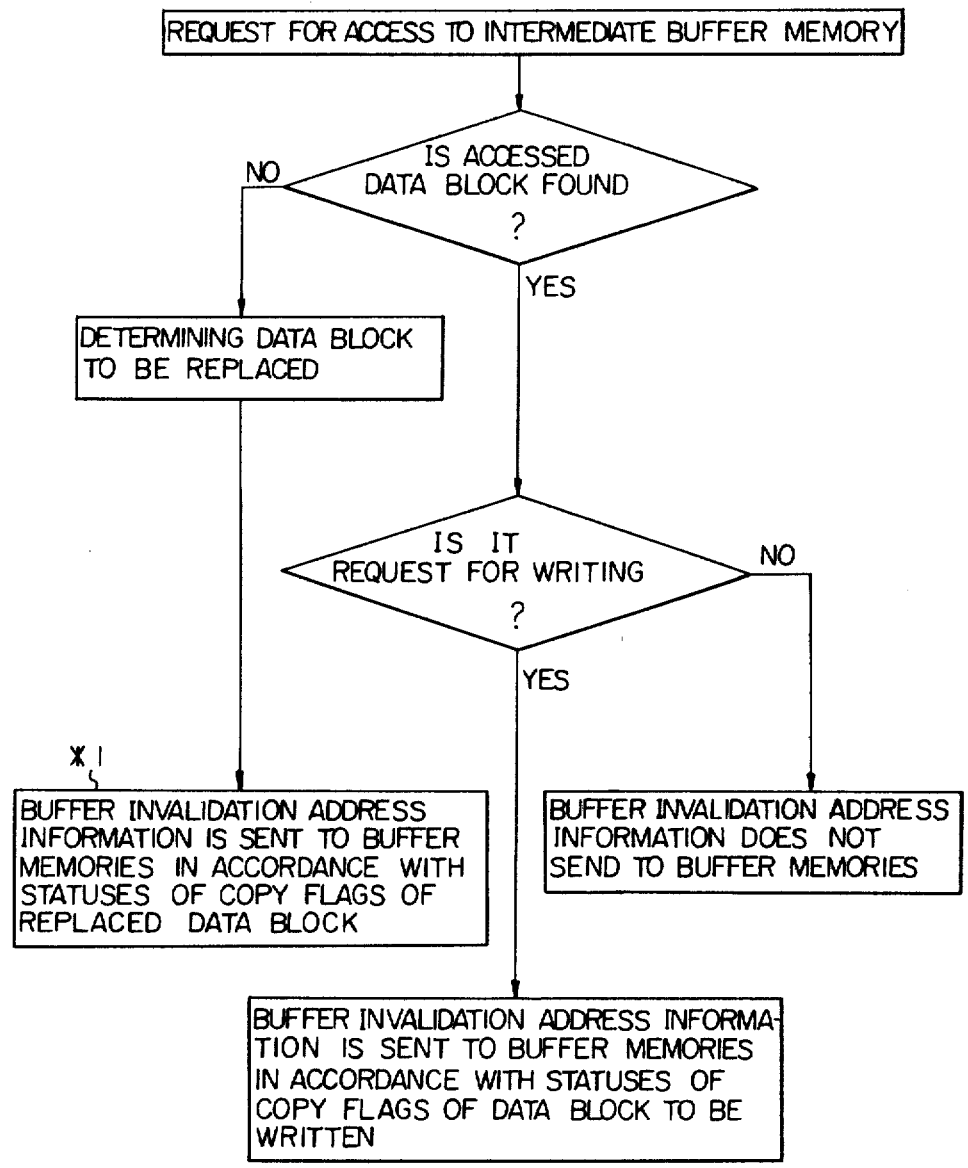
Figure 3A:
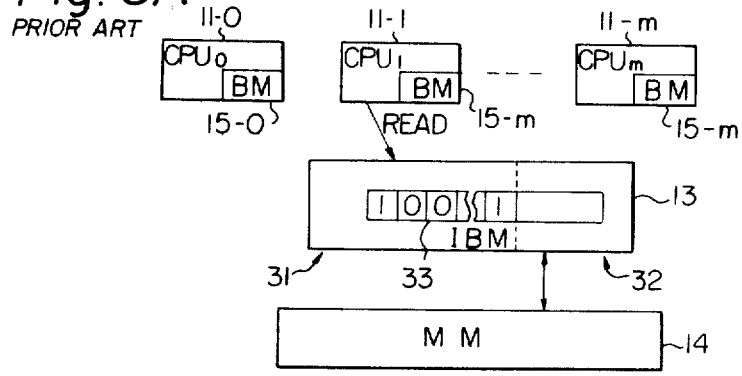
Figure 3B:
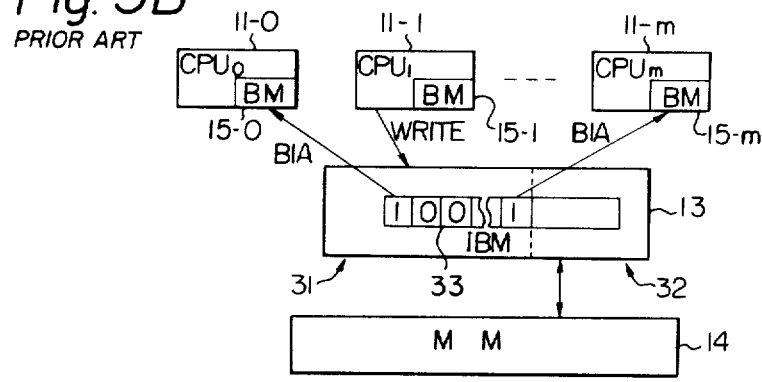
Figure 3C:
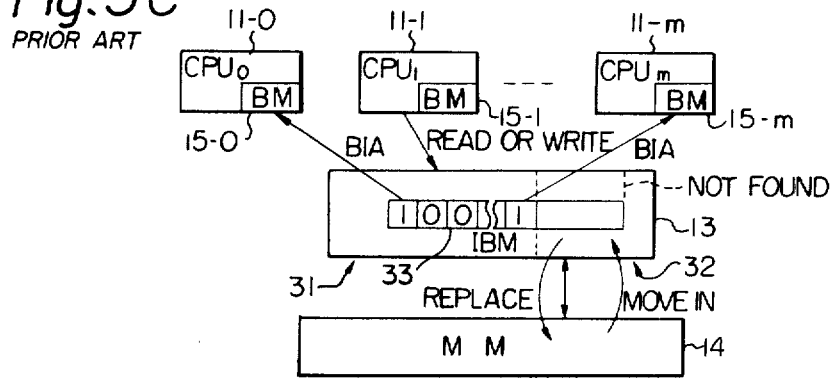
Figure 4:
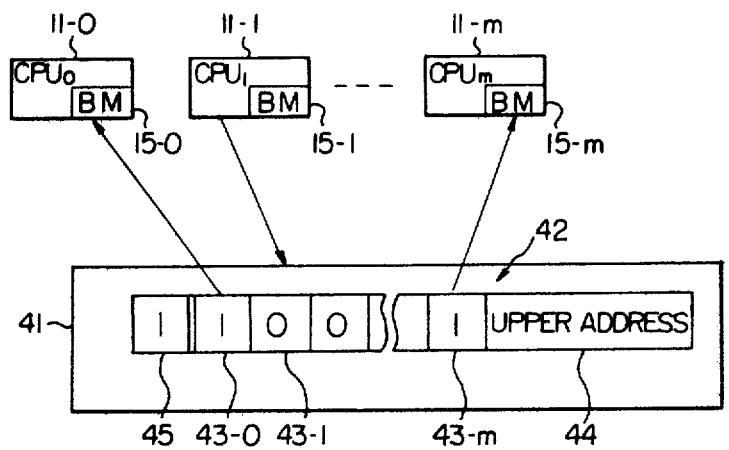
Figure 6A:
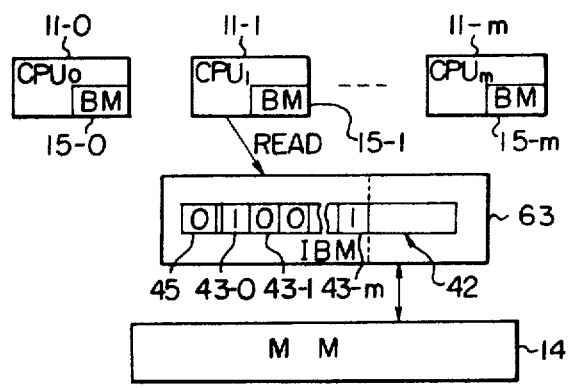
Figure 6B:
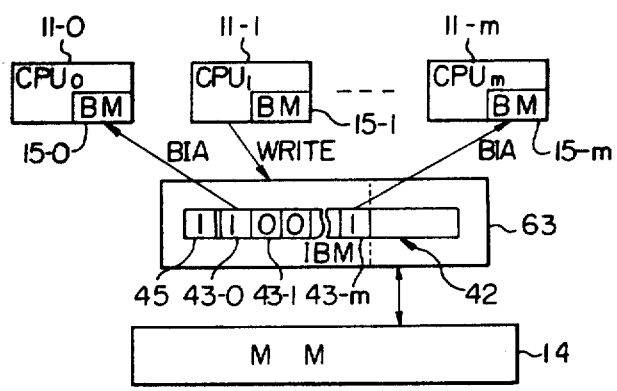
Figure 6C:
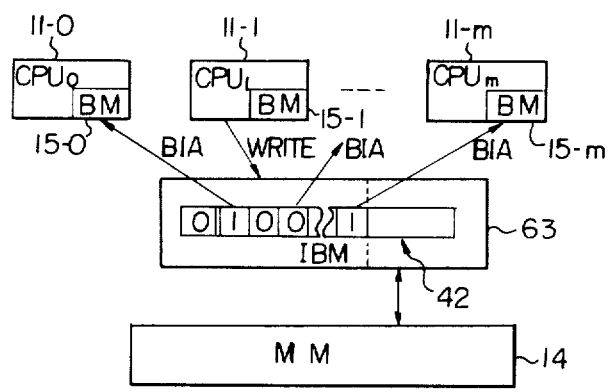
Figure 6D:
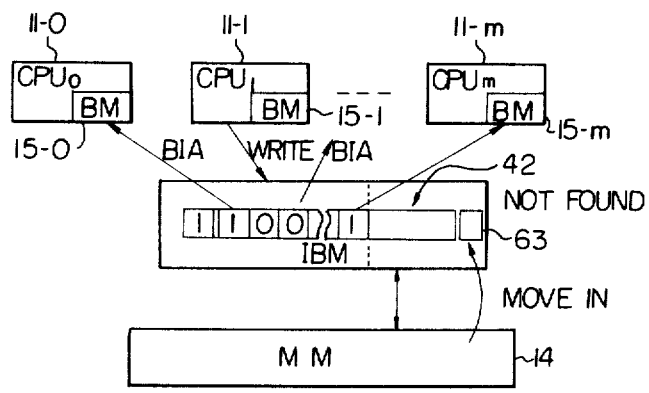
Figure 7A:
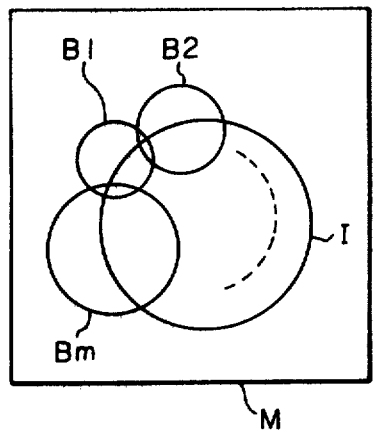
Figure 7B:
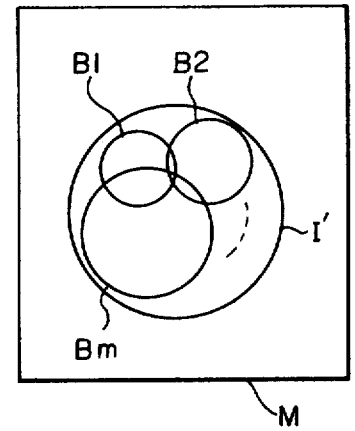
Figure 9:
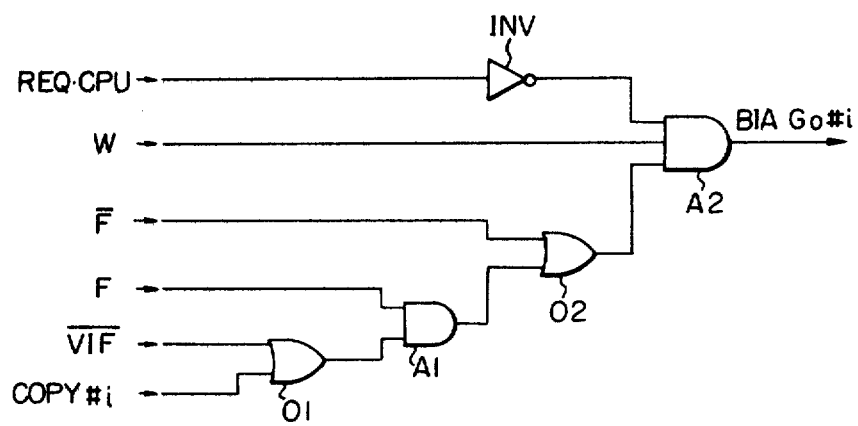
Figure 8:
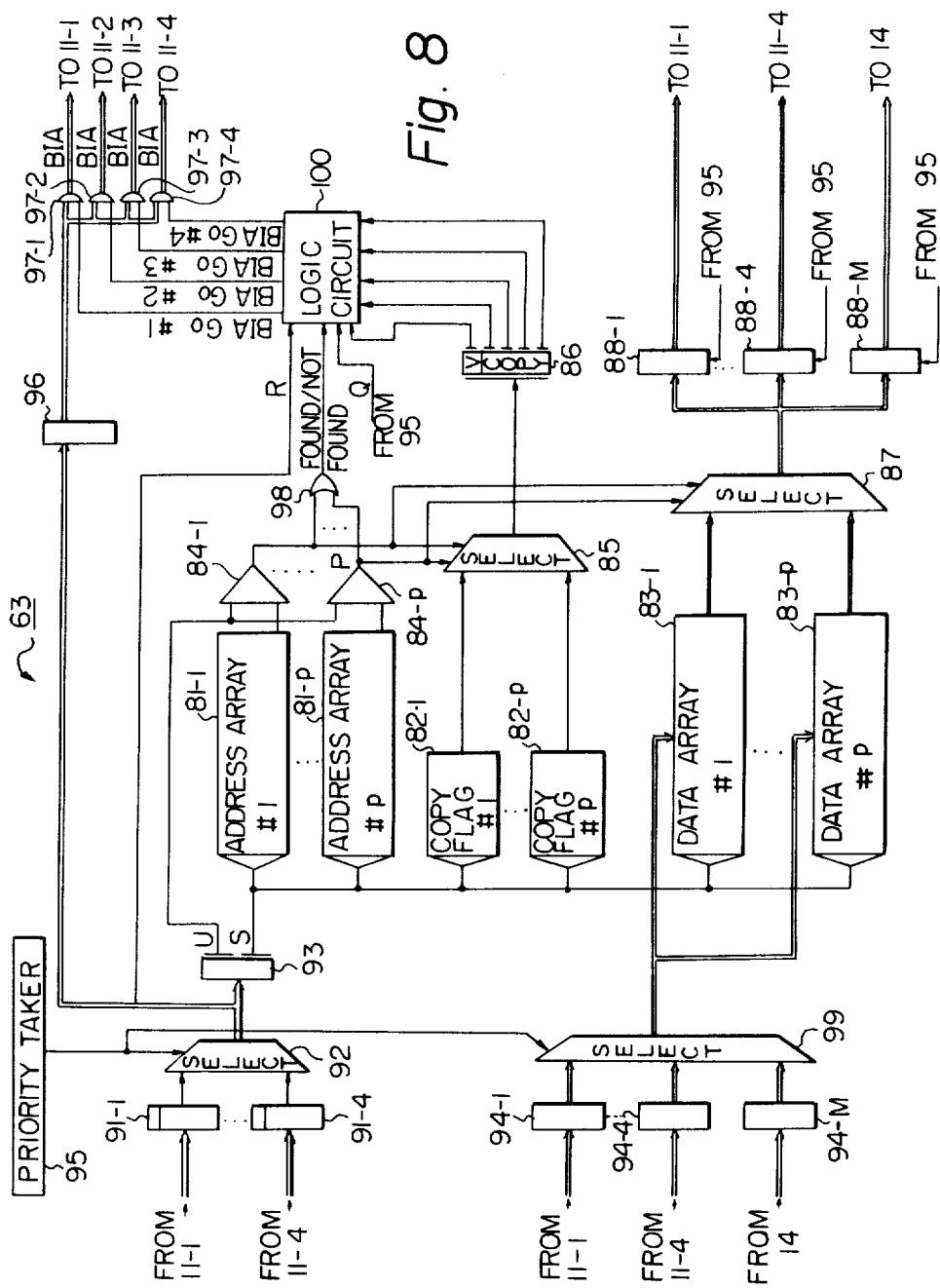

UNITED STATES PATENT AND TRADEMARK OFFICE
CERTIFICATE OF CORRECTION

PATENT NO. : 4,290,103
DATED : September 15, 1981
INVENTOR(S) : Hattori

It is certified that error appears in the above—identified patent and that said Letters Patent is hereby corrected as shown below:

Column 4, line 22, change "thhe" to -- the --;

line 40, after "memory" insert -- area --;

line 62, after "BLOCK" insert -- " --;

line 63, after "2" delete -- " --.

Column 5, line 55, delete "again".

Column 9, lines 10 and 14, "O" should be -- "0" --.

Column 11, line 8, after "memory" insert -- , --;

Column 13, line 68, after "Then" insert -- , --.

Column 14, line 16 and 45, change "$\overline{REQ.CPU}$" to -- $\overline{REQ \cdot CPU}$ --;

line 17, change "{" to --}--;

line 24, change "$\overline{REQ}$.-" to -- "$\overline{REQ \cdot}$-" --;

lines 33 and 50, change "F" to -- "$\overline{F}$" --;

line 35, change "$\overline{F}$" to -- "F" --;

line 50, change "X" to -- x --; and change "{" to --}--;

UNITED STATES PATENT AND TRADEMARK OFFICE
CERTIFICATE OF CORRECTION

PATENT NO. : 4,290,103
DATED : September 15, 1981
INVENTOR(S) : Hattori

It is certified that error appears in the above—identified patent and that said Letters Patent is hereby corrected as shown below:

line 52, change the expression "$\{\overline{FVFX}(\overline{VIF}vCOPY\#i)\}$" to -- $\{\overline{FvFx}(\overline{VIF}vCOPY\#i)\}$ --;

line 60, change "VIF" to -- $\overline{VIF}$ --.

Column 15, line 1, change "$\{$" to -- $\}$ --;

line 10, "REQ.CPU" should be -- $\overline{REQ \cdot CPU}$ --; and "$\overline{REQ \cdot CPU}$" should be -- $\overline{REQ \cdot CPU}$ --;

line 18, change "ofrom" to -- from --.

Column 17, lines 24, 31 and 33, "$\overline{REQ.CPU}$" should be -- $\overline{REQ \cdot CPU}$ --;

line 31, all three occurrences of "X" should be -- x --;

line 40, after "indicates" insert -- that --;

line 59, change "flags" to -- flag --.

Column 21, line 11, "$\overline{REQ.CPU}$, W,F" should be -- $\overline{REQ \cdot CPU}$, W, $\overline{F}$ --.

Column 22, lines 1 and 2 should be

--BIA 60 #i= $\overline{REQ \cdot CPU}xWx\{\overline{FvFx}(COPY \#iv\overline{VIF})\}$ ;

line 3, change " "$\overline{REQ.CPU}$" " to -- "$\overline{REQ \cdot CPU}$" --; and "i=th" should be -- i-th --;

UNITED STATES PATENT AND TRADEMARK OFFICE
CERTIFICATE OF CORRECTION

PATENT NO. : 4,290,103
DATED : September 15, 1981
INVENTOR(S) : Hattori

Page 4 of 4

It is certified that error appears in the above—identified patent and that said Letters Patent is hereby corrected as shown below:

line 7, the second occurrence of "F" should be -- $\overline{F}$ --;

line 14, change "X" to -- x --.

Column 18, line 57, change "flags" to -- flag.

Signed and Sealed this

Sixth Day of April 1982

[SEAL]

Attest:

GERALD J. MOSSINGHOFF

*Attesting Officer*     *Commissioner of Patents and Trademarks*